(12) United States Patent
Ydstie

(10) Patent No.: US 8,095,227 B2
(45) Date of Patent: Jan. 10, 2012

(54) APPARATUSES, SYSTEMS, AND METHODS UTILIZING ADAPTIVE CONTROL

(75) Inventor: Birger Erik Ydstie, Allison Park, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 423 days.

(21) Appl. No.: 11/922,180

(22) PCT Filed: Jun. 13, 2005

(86) PCT No.: PCT/US2005/020863
§ 371 (c)(1),
(2), (4) Date: Dec. 13, 2007

(87) PCT Pub. No.: WO2007/001252
PCT Pub. Date: Jan. 4, 2007

(65) Prior Publication Data
US 2009/0132064 A1   May 21, 2009

(51) Int. Cl.
*G05B 13/02* (2006.01)
*G05B 13/04* (2006.01)
*G05B 6/02* (2006.01)
(52) U.S. Cl. ............ 700/45; 700/29; 700/31; 700/44
(58) Field of Classification Search ........... 700/28, 700/29, 30, 31, 32, 33, 42, 44, 45
See application file for complete search history.

(56) References Cited

U.S. PATENT DOCUMENTS

| | | | | |
|---|---|---|---|---|
| 4,641,235 A * | 2/1987 | Shigemasa et al. | ............ | 700/29 |
| 5,282,261 A | 1/1994 | Skeirik | | |
| 5,335,164 A | 8/1994 | Gough, Jr. et al. | | |
| 5,408,405 A * | 4/1995 | Mozumder et al. | ............ | 700/31 |
| 5,519,605 A * | 5/1996 | Cawlfield | ............ | 700/31 |
| 5,568,378 A | 10/1996 | Wojsznis | | |
| 6,064,916 A * | 5/2000 | Yoon | ............ | 700/45 |
| 6,094,602 A * | 7/2000 | Schade, III | ............ | 700/45 |
| 6,577,908 B1 | 6/2003 | Wojsznis et al. | | |
| 6,738,682 B1 * | 5/2004 | Pasadyn | ............ | 700/44 |
| 6,757,579 B1 * | 6/2004 | Pasadyn | ............ | 700/29 |
| 6,826,521 B1 | 11/2004 | Hess et al. | | |
| 7,050,865 B2 * | 5/2006 | Yasui et al. | ............ | 700/32 |
| 2002/0016640 A1 * | 2/2002 | Gagne | ............ | 700/29 |
| 2003/0065409 A1 | 4/2003 | Raeth et al. | | |
| 2003/0229408 A1 * | 12/2003 | Yasui et al. | ............ | 700/30 |
| 2005/0096758 A1 | 5/2005 | Takezawa et al. | | |

OTHER PUBLICATIONS

PCT Notification Concerning Transmittal of International Preliminary Report on Patentability for application PCT/US2005/020863, dated Jan. 3, 2008.

(Continued)

*Primary Examiner* — Charles Kasenge
(74) *Attorney, Agent, or Firm* — Dennis M. Carleton; Fox Rothschild LLP

(57) ABSTRACT

A method for controlling a process, wherein the process has an input and an output, and including controlling the input to the process; predicting the output of the process based on a first set of operating parameters; predicting the output of the process based on a second set of operating parameters; updating the first set of operating parameters when a result from predicting the output from the first set of parameters differs from the output of the process by more than a predetermined amount, wherein the predetermined amount is a function the output predicted by the second set of parameters. The invention also includes apparatuses and systems.

20 Claims, 5 Drawing Sheets

OTHER PUBLICATIONS

PCT International Preliminary Report on Patentability for application PCT/US2005/020863, dated Dec. 17, 2007 (included with the PCT Notification Concerning Transmittal of International Preliminary Report on Patentability cited above).

PCT Written Opinion of the International Searching Authority for application PCT/US2005/020863, (included with the PCT Notification Concerning Transmittal of International Preliminary Report on Patentability cited above).

Fortescue, T.R., Kershenbaum, L.S., Ydstie, B.E., Implementation of Self-tuning Regulators with Variable Forgetting Factors, Automatico, 1981, pp. 831-835, vol. 17, No. 6, International Federation of Automatic Control, Pergamone Press Ltd.

Ydstie, B.E., Kemna, A.H., Liu, L.K., Multivariable Extended-Horizon Adaptive Control, Comput. chem. Engng, 1988, pp. 733-743, vol. 12, No. 7, Pergamon Press.

Astrom, K.J., Wittenmark, B., Adaptive Control, 1989, Chapter 1, Sections 1.1, 1.4, 1.5; Chapter 11, Sections 11.1, 11.2, 11.3; Addison-Wesley Publishing Company.

Golden, M.P., Ydstie, B.E., Small Amplitude Chaos and Ergodicity in Adaptive Control, Automatica, 1992, pp. 11-25, vol. 28, No. 1, International Federation of Automatic Control, Pergamon Press.

Golden Kusch, M., Ydstie B.E., Drift Instabilities and chaos in forecasting and adaptive decision theory, Physica D, 1994, pp. 309-323, 72, Elsevier Science B.V.

Hsu Hill, J., Ydstie, B.E., Adaptive control with selective memory, International Journal of Adaptive Control and Signal Processing, 2004, pp. 571-587, 18, John Wiley & Sons, Ltd.

Ydstie, B.E., Sargent, W.H., Convergence and Stability Properties of an Adaptive Regulator with Variable Forgetting Factor, Automatica, 1986, pp. 749-751, vol. 22, No. 6, International Federation of Autotmatic Control, Pergamon Journals, Ltd.

Ydstie, B.E., Kershenbaum, L.S., Sargent, R.W.H., Theory and Application of an Extended Horizon Self-Tuning Controller, AIChE J., Nov. 1985, pp. 1771-1780, vol. 31, No. 11.

PCT Invitation to Pay Additional Fees for PCT/US2005/020863, dated Feb. 17, 2006, including PCT Annex to Form PCT/ISA/206 (Communication Relating to the Results of the Partial International Search).

PCT Notification of Transmittal of the International Search Report and the Written Opinion of the International Searching Authority for PCT/US2005/020863, dated Jun. 13, 2006.

PCT International Search Report for PCT/US2005/020863, dated Jun. 13, 2006.

PCT Written Opinion of the International Searching Authority for PCT/US2005/020863, dated Jun. 13, 2006.

* cited by examiner

APPARATUSES, SYSTEMS, AND METHODS UTILIZING ADAPTIVE CONTROL

CROSS-REFERENCE TO RELATED APPLICATIONS

This application claims priority from PCT application PCT/US2005/020863, filed Jun. 13, 2005, which is incorporated herein by reference.

STATEMENT REGARDING FEDERALLY-SPONSORED RESEARCH AND DEVELOPMENT

Not applicable.

FIELD OF THE INVENTION

The present invention is directed generally to methods, apparatuses, and systems utilizing adaptive control and, more specifically, to such methods, apparatuses, and systems which utilize more than one adaptive predictive model.

BACKGROUND OF THE INVENTION

Adaptive control is a method to tune controller parameters automatically. Adaptive technology has been most successful in applications where the method can be standardized to tune one or a few parameters (e.g. in the automotive industry for fuel injection) or in difficult applications where advanced process engineers can justify spending time and resources to tune the adaptive controllers and develop "safety nets" so that they behave in robust and stable manner.

A class of algorithms for adaptive control was tried in the 1950s, but those methods did not enjoy as much success as expected because, in part, situations arose when the systems became unstable. Similar methods enjoyed a renaissance in the 1970s when inexpensive computers became available for process control and more complex algorithms could be applied in real time.

FIG. 1 illustrates one embodiment of a prior art adaptive control system 10 utilizing a process known as "certainty equivalence adaptive" ("CEA") control. In general, a CEA control system 10 consists of four distinct elements: a state estimator 12, an adjustable model 14, a control design algorithm 16, and a controller 18. The CEA control system 10 controls a process 20. Differences exist between the model 14 and the actual process 20. These differences are reflected as "disturbances" entering the process and affecting the output. The control system 10 receives initial set-up parameters, either manually or from an expert system 22. Subsequent set-up parameters may also be provided as described below.

The state estimator 12 estimates the state of the process 20 to be controlled. The estimated state is passed to the adjustable model 14 and the controller 18. The model 14 estimates the output of the process 20 based on the estimated state, and the estimated output from the model 14 and the actual output of the process 20 are compared, and the difference is called the "model error". The model error is used to adjust parameters in the model 14 in an attempt to reduce the model error. The new or adjusted parameters for the model 14 are passed to the control design algorithm 16 which utilizes an algorithm for control design which may be based on predictive control or pole-placement to adjust the parameters of the controller 18 in response to the new parameters of the model 14. Many different embodiments of linear and nonlinear CEA control have been published. See, for example, (Adaptive Control, Second Edition, K. J. Astrom and B. Wittenmark, Addison-Wesley Pub. Co. Reading Mass., 1995), which is incorporated herein by reference.

One problem with prior art adaptive control is that they are not robust with respect to model errors and disturbances due to interactions between the different adaptive components. One type of instability is illustrated in FIG. 2 and is known as "bursting". This problem is also described in Golden, M. P. and Ydstie, B. E. "Ergodicity and Small Amplitude Chaos in Adaptive Control", Automatica, Vol. 28, No. 1, January 1992, pp 11-25, which is incorporated herein by reference. FIG. 2 illustrates an adaptive controller used to control a system with a single output "y", a single manipulated control input "u", and a-single set point which is equal to zero. The output trends towards zero initially. But then there is a divergence before the output appears to converge again. This behavior continues and it causes spikes in the output. The problem is due to a nonlinear interaction among model adjustment, the control design and process itself which can be understood as follows. During periods of instability the data contains dynamic information and the controller is properly adapted. During stable periods there is little information present and the adaptive controller parameters drift until the loop becomes unstable. We then observe a burst and new data are accumulated that allows the model to retune. This cycle repeats. This type of instability is subtle since it cannot be solved using linear control theory. An article entitled *Adaptive Control with Selective Memory*, by Hill and Ydstie, published in *International Journal of Adaptive Control and Signal Processing*, 2004, 18:571-587, which is incorporated herein by reference, gives a description of the problem.

Many methods have been proposed to stop parameter drift and bursting. A brief review is given below and in *Adaptive Control with Selective Memory*, by Hill and Ydstie (cited above). Each of these requires the input of an extra system to check the stability of the closed loop as indicated in FIG. 1. The stability checking system can be implemented as an expert system 22 as suggested by (Adaptive Control, Second Edition, K. J. Astrom and B. Wittenmark, Addison-Wesley Pub. Co. Reading Mass., 1995), which is incorporated herein by reference. However, it has been found that it is difficult to develop a system with broad and general applicability. Good performance of adaptive control has been reported only for specific applications were significant engineering time was spent to adjust the adaptive controller to the particular application.

The deadzone approach was introduced to stop the estimation once error between the predictive control model and the process output gets below a certain value. The deadzone method utilizes a single predictive model but good performance and stability depend on correctly choosing the deadzone. It has to be larger than the noise level but not too large since this gives poor performance. It is therefore not easy to choose the deadzone in a practical application since real disturbances have non-stationary and unknown distribution functions.

The leakage method was introduced to prevent parameter drift by biasing the model parameters towards a set of fixed reference parameters. One disadvantage of the leakage method is that it does not prevent drift and burst unless the reference parameters are carefully chosen.

Another prior art solution is to periodically excite the input signal in an attempt to reduce parameter drift. This has several disadvantages. One disadvantage is that it may not be easy to choose the right amplitude and frequency of the excitation.

Another disadvantage is that this method leads to reduced steady state performance because the signals are perturbed by the periodic excitation.

*Adaptive Control with Selective Memory*, by Hill and Ydstie (cited above), introduced a method to control drift and burst which is based on the selecting informative data. They used the Fisher Information Matrix and a variance estimator to decide if the data is informative. The parameter estimates are updated when the information matrix or the variance estimate increase. The selective memory approach is simple to implement and stability is independent of the noise characteristics and tunable parameters. A shortcoming of this method are that the estimator eventually becomes insensitive to new data and that bounds for the performance have not been established.

Several US patents have been issued that describe methods for adaptive process control. These include U.S. Pat. Nos. 5,282,261, 5,335,164, 5,568,378 and 6,577,908. The teachings in all of those patents fail to stop parameter drift and bursting.

Virtually all process industries that manufacture chemicals and petroleum related products, including many composite materials, food, metals, glass, and forest products, rely on the use of computer control to stabilize their processes and optimize their performance. More than 90% of all control loops for continuous processes in the process industries use the "PID" (proportional, integral, derivative) type controller. The theory for PID control and basic tuning principles were established more than 50 years ago. The technology is well established and well entrenched. New technology for controlling chemical processes has had very limited impact outside petroleum processing where multivariable predictive control has been applied. And even here the predictive controller is usually used in a supervisory mode to tune the set points of the PID controllers.

PID controllers have three parameters that need be tuned. About half of all PID controllers in industry are not well tuned (PID Controllers: Theory, Design and Tuning, K. Astrom and T Hagglund, $2^{nd}$ edition Instrument Society of America, Research triangle Park, N.C., 1995). The manpower and expertise needed to maintain and tune these controllers is not available in many companies. This has resulted in significant losses due to mistuned controllers. Application of well tuned and optimized multivariable predictive controllers has led to total savings of in the excess of one billion dollars per year in the petrochemical industry (Morari, M. and G Gentilini, Challenges and opportunities in process control: Biomedical processes, AIChE J., Vol 47, pp 2140-2143, 2001). The fixed parameter predictive controller in current use is expensive to implement and maintain because it needs to be tuned by experts skilled in the art of process identification.

Many methods have been developed and methodologies exist to automatically tune and adapt control parameters using process data. In some applications it has been found that adaptive updating of parameters in model predictive control applications can give close to optimal control performance. Attempts to implement these very promising methods on a broad basis in industry have been fraught with difficulty, however. Hardware and software incompatibilities made it difficult and expensive to work across different computational platforms in the past. More importantly, the methods themselves have not been as robust as they should be. It is generally believed that the lack of robustness is due to parameter drift which sets in when the data used to update the model is not informative. Methods that were developed to solve this problem turned out to be more complex than expected. Many fixes are required to make an adaptive system work well under realistic operating conditions. As stated in *Adaptive Control, Second Edition*, K. J. Astrom and B. Wittenmark, Addison-Wesley Pub. Co. Reading Mass., 1995, "adaptive systems are not black box solutions that are a panacea."

Current adaptive controllers can therefore be more difficult to tune than PID controllers and the tuning methods are often less transparent than those offered for classical PID control with feedforward. The method developed here solves these problems since the adaptation is robust and is based on informative data only and the parameters that need to be set can be related directly to closed loop performance parameters.

There exists a market for adaptive control methods. As mentioned above, there are literally millions of controllers in the process industries that are not optimally tuned. The performance losses can be substantial. The long term vision for adaptive control is to replace these methods, which are based on 1940s technology, with more efficient adaptive methods that not only will be less expensive to implement and maintain, they also will give considerably better performance.

Accordingly, there is a need for improved adaptive control systems, devices, and methods. In particular, there is a need for adaptive control systems, devices, and methods which can reduce or eliminate parameter drift and bursting. Those and other advantages of the present invention will be described in more detail hereinbelow.

BRIEF SUMMARY OF THE INVENTION

The present invention includes methods, apparatuses and systems related to utilizing adaptive process control. The present invention can be used, for example, to reduce or prevent parameter drift and burst instability. In some embodiments, the advantages of the present invention can be realized without the use of process information, although the present invention may also be used with process information. The present invention addresses the technical requirements of being robust and stable under a broad range of conditions including unmodeled dynamics and bounded disturbances without unknown magnitude and distribution function.

The present invention can be applied, for example, to multivariable adaptive predictive control with one error for each process output. The present invention can also be used to tune the parameters of predictive controllers used, for example, for supervisory control in many petrochemical and other processes. The present invention can also be applied, for example, to stabilize nonlinear adaptive controllers based on neural networks and/or passivity theory rather than certainty equivalence principle. The present invention can also be applied, for example, to develop a new approach for real time optimization, in which case the present invention may be used, for example, to find the operating point corresponding to that which maximizes a given performance objective.

The present invention may be used for certainty equivalence adaptive ("CEA") control, but the present invention may also be used in other types of adaptive systems as well. The present invention allows for the control of parameter drift by comparing the error of an adaptive control model with the error of an adaptive audit model. The adaptive control model is updated if its error is larger than that of the audit model plus some tolerance. The present invention offers several advantages over the prior art. One advantage is that the number of parameters that must be chosen is less than that required by the prior art. In particular, the present invention can learn and adapt itself to a process so that the system will determine and tune certain parameters that would otherwise need to be manually set or controlled by an expert system. Another advantage is that the present invention gives more stable control than the prior art. Another advantage is that the present invention offers significant improvements in performance when compared with the prior art.

Many variations are possible with the present invention. For example, many types of adjustable models 14, controllers 18, and other devices and methods associated with the prior art are known, and it is believed that the present invention is applicable to all types and combinations of prior art models 14, controllers 18, and other devices and methods. Examples of prior art adjustable models include autoregressive moving average, Laguerre Model, impulse response, state space models, and others. Examples, of prior art controllers include minimum variance, pole placement, model predictive, PID, and others. Examples of methods to update parameters include gradient algorithm, recursive least squares, forgetting factor algorithms, and others. These and other variations and combinations of models 14, controllers 18, and other prior art devices and methods are applicable to the present invention. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein.

DETAILED DESCRIPTION OF THE INVENTION

Figure 3:
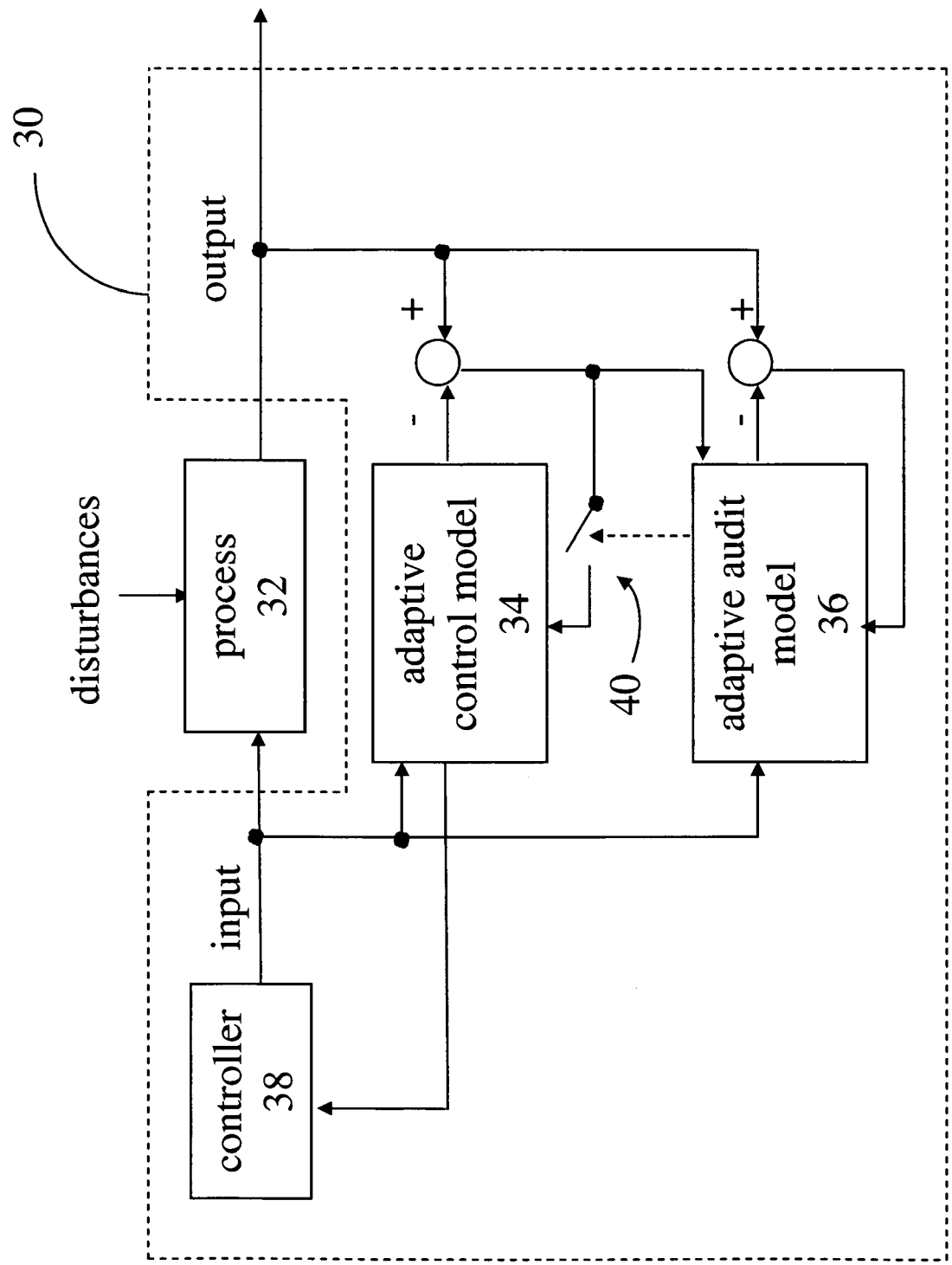
FIG. 3 is a block diagram illustrating one embodiment of the present invention.

FIG. 3 is a block diagram of a system 30 illustrating one embodiment of the present invention. The system 30 includes a process 32 to be controlled, an adaptive control model (ACM) 34, an adaptive audit model (AAM) 36, a controller 38, and a switch 40. This system 30 uses two predictive models, the ACM 34 and the AAM 36. The ACM 34 provides feedback to the controller 38, and the AAM 36 gauges the accuracy of the ACM 34 and selectively updates it. In particular, the AAM 36 closes the switch 40 and the ACM 34 is updated when a suitable norm of its prediction error is larger than that of the AAM 36 plus a tolerance. The value of the tolerance will vary in different applications, and it can also be zero (i.e., no tolerance). Furthermore, the tolerance may be constant or it may vary. A variable tolerance may be useful, for example, in a nonlinear system where tight control is needed in some operating regions and less tight control is needed in other regions.

For the purposes of the illustrated embodiment, it is assumed that the process 32 has an input which can be controlled or in some way affected or manipulated. It is also assumed that the process 32 has an output which can be measured. Finally, it is not assumed that the process 32 is modeled perfectly, and the differences between the modeled process and the actual process are represented by "disturbances" input to the process 32.

The ACM 34 and the AAM 36 both receive information regarding input provided from the controller 38 to the process 32. In addition, the AAM 36 receives information regarding the output of the process 32. The ACM 34, however, only receives certain information regarding the output of the process 32 when the switch 40 is closed. As will be described in more detail hereinbelow, the switch 40 is controlled by the AAM 36.

Figure 1:
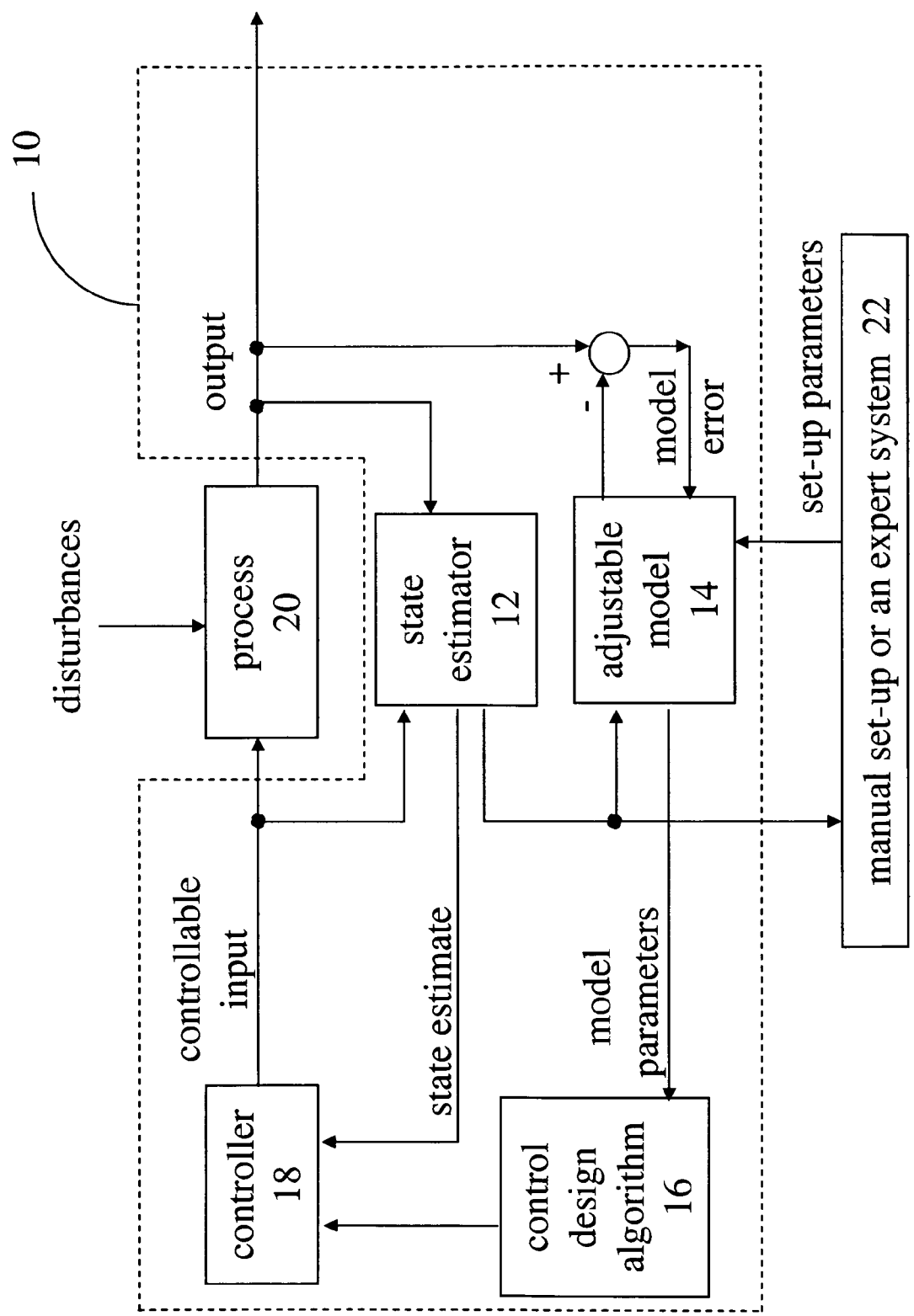
FIG. 1 is a block diagram of a prior art certainty equivalence adaptive controller.
Figure 2:
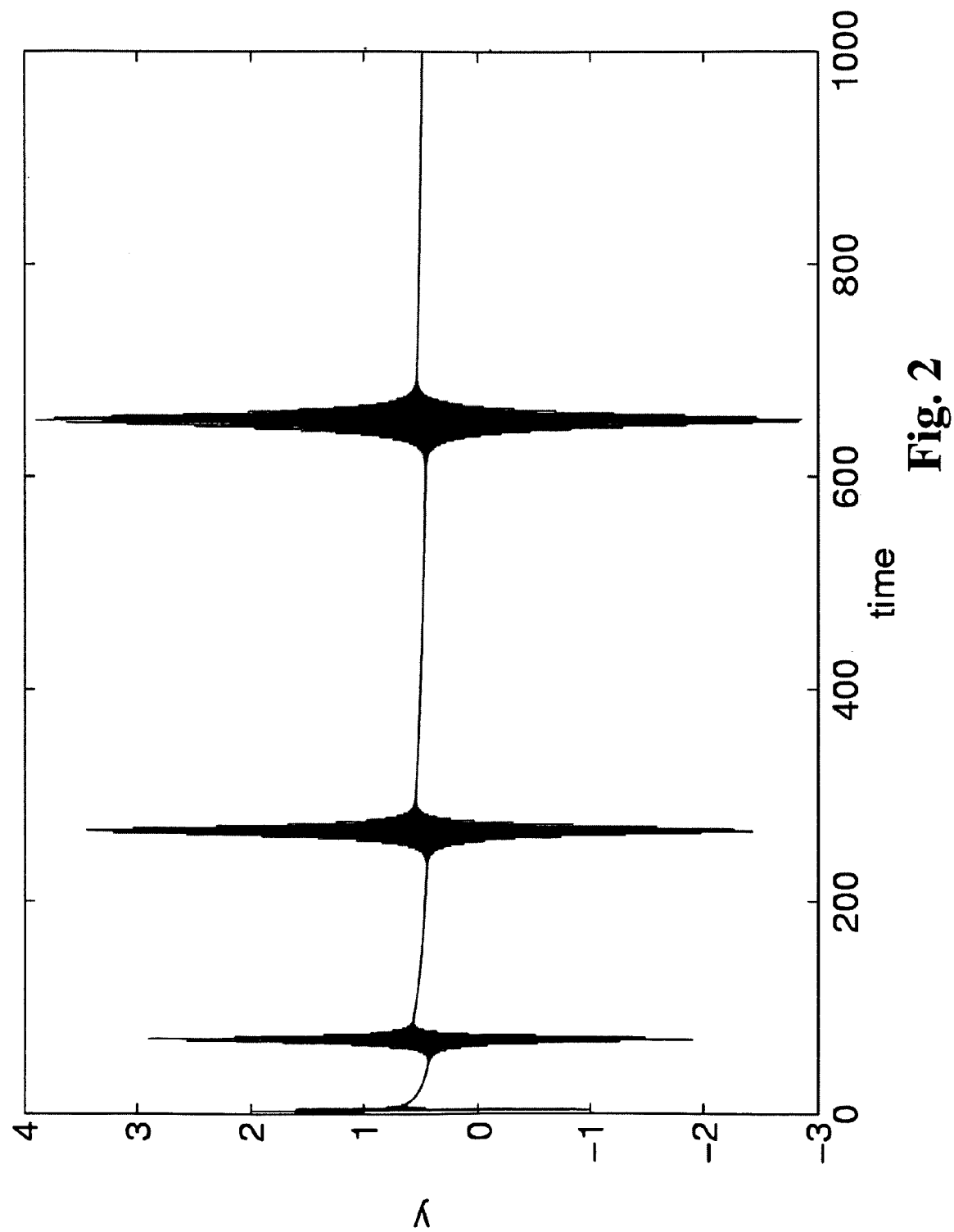
FIG. 2 illustrates parameter drift and bursting in adaptive control system.

The ACM 34 and AAM 36 may be of the same design and construction or they may be different. For example, each of the ACM 34 and the AAM 36 may be implemented with a state estimator 12, an adjustable model 14, and a control design algorithm 16 as described with regard to FIG. 1. Alternatively, one or both of the ACM 34 and AAM 36 may be different from the combination of state estimator 12, adjustable model 14, and control design algorithm 16. For example, the AAM 36 may include a state estimator 12 and adjustable model 14 as illustrated in FIG. 1, but may not include a control design algorithm 16, particularly when the AAM 36 does not provide information to the controller 38. The ACM 34 and the AAM 36 may share the same state estimator (e.g., the ACM 34 and AAM 36 may use the same state estimate data). In other embodiments, the ACM 34 and the AAM can have separate state estimators, each of which may utilize the same or different state estimation algorithms, parameters, inputs, and other criteria. In addition, the state estimate used for control is not necessarily the same as that used for model adaptation. Furthermore, the ACM 34 and AAM 36 may model the process 32 in the same way or in different ways. For example, the ACM 34 and AAM 36 may use different algorithms, different parameters, and different inputs to estimate the state of the process 32. The ACM 34 and AAM 36 may be linear or nonlinear devices. In the illustrated embodiment, the ACM 34 and the AAM 36 produce a prediction error by comparing their modeled output for the process with the actual output of the process 32. However, prediction errors may be produced in other ways and, in other embodiments, other information may be used in place of or in addition to the illustrated prediction errors.

The ACM 34 and AAM 36 are illustrated as being separate, although they may be implemented together. For example, the ACM 34 and AAM 36 may be implemented as two processes running on a single processor, or as two processes running on separate processors in a single device. In another embodiment, both the ACM 34 and the AAM 36 may be implemented in a single process running on a processor, or running simultaneously on two or more processors. Similarly, other parts of the system 30 may be implemented, together or separately, as processes or computer software implemented on one or more processors.

The controller 38 provides one or more outputs which may be used as inputs to the process 32 or which may be used to affect one or more inputs to the process 32. The controller 32 has certain operating parameters which influence the outputs of the controller 38 and, thereby, affect the process 32. The parameters of the controller 38 may be adjusted from time to time to improve the control of the process 32. The controller 38 receives information from the ACM 34, and this information may be used to adjust the controller's 38 parameters. For example, the controller 38 may adjust its operating parameters in response to information indicating that the ACM 34 has adjusted its operating parameters (e.g., the modeling parameters used by the ACM 34 to model the process 32). In one embodiment, the controller 38 only changes its operating parameters when it receives information indicating that the ACM 34 has changed its operating parameters. For example, the controller 38 may receive information indicating the new or changed parameters for the ACM 34, and the controller 38 may calculate new parameters for itself (e.g., the operation performed by the control design algorithm 16 in FIG. 1). Alternatively, the ACM 34 or some other device may calculate new control parameters for the controller 38 based on changes in the ACM 34 and/or based on other information. The controller 38 may also receive information from the AAM 36 or other devices, and this information may also be used to adjust the parameters of the controller 38 or to adjust other operations of the controller 38.

The controller 38 may act to stabilize the ACM 34, such as by performing a "weighted least squares" process in which the controller 38 attempts to minimize the sum of the square of the difference between the modeled output and a given reference signal, called the setpoint, over some prediction horizon, while satisfying process constraints. This is the approach used in Model Predictive Control, although other methods for control design may also be used.

The switch 40 allows for selectively providing information to the ACM 34 regarding the process 32. In the illustrated embodiment, the switch 40 allows for selectively providing information to the ACM 34 representing the difference between the output of the process 32 and the process output predicted by the ACM 34. In other embodiments, the switch 40 may selectively provide other information to the ACM 34. For example, the switch 40 may provide information related to one or more outputs of the process 32, such as temperature, flow rate, pressure, error rate, throughput, etc. This information may be a direct measurement of one or more outputs of the process 32, or it may be information which has been processed or modified, such as in the illustrated embodiment where the information represents a difference between the measured output and the modeled output.

The switch 40 may be a mechanical switch, a solid state switch, or it may take some other form to selectively control the flow of information to the ACM 34. For example, the switch 40 may be internal to the ACM 34, such as in the form of a logic circuit within the ACM 34 which selects or enables the ACM 34 to perform a function or a process or to otherwise utilize or act on the information regarding the process 32.

The switch 40 is illustrated as being controlled by the AAM 36, although this is not required. For example, the switch 40 may be controlled by the controller 38. Alternatively, the ACM 34 may control the switch and, thereby, determine for itself when to receive certain information. Additional devices may also be provided to control the switch 40. In the event a device other than the AAM 36 controls the switch 40, other changes may be made to the system 10, such as providing model error information and/or other information to the appropriate devices.

Although the present invention has been described in terms of either updating the ACM 34 or not updating the ACM 34, many other variations are possible. For example, the ACM 34 may be partially updated. The degree to which the ACM 34 is updated may vary, for example, as a function of the difference between the model errors of the ACM 34 and the AAM 36. For example, if the difference between the model errors is small, no update will be performed. As the model error of the ACM 34 becomes larger than that of the AAM 36, a portion (but not all) of the ACM 34 parameters will be updated. Alternatively, all of the ACM 34 parameters may be updated, but the amount by which any parameter changes can be limited, or may be only a percentage of the change that would occur in a full update of the ACM 34 parameters. In these embodiments, both the timing of the updates to the ACM 34, and the extent of those updates, is controlled.

The ACM 34, AAM 36, the controller 38, and the switch 40 may take many forms. For example, they may be integrated devices or they may be comprised of discrete components. They may be general purpose devices or application specific devices. They may include solid state components and they may include mechanical components. They may be linear devices or a nonlinear devices. Those and other variations are possible.

The present invention utilizes both the ACM 34 and the AAM 36 to provide improved performance and to reduce bursting and parameter drift. Both the ACM 34 and the AAM 36 receive information regarding one or more inputs to the processes 32 as provided by the controller 38. Both the ACM 34 and AAM 36 also model the process 32, such as with a state estimator 12 and an adjustable model 14. However, the switch 40 prevents some information from being processed by the ACM 34, while that information is received by and processed by the AAM 36. As a result, the AAM 36 will be able to utilize this information to update itself and make adjustments more often than the ACM 34. These updates and adjustments may include, for example, adjusting parameters used to model the process 32 in attempts to reduce model errors or to improve some other metric. As a result, the ACM 34 will update or adjust itself less often than the AAM 36. In one embodiment, the controller 38 only updates its operating parameters when the ACM 34 updates its parameters, thereby providing for a more stable controller 38. At the same time, the AAM 36 is being adjusted more often, thereby allowing a check or audit on the status of the ACM's 34 model of the process 32. As long as the ACM's 34 model of the process 32 is within acceptable limits, the ACM's 34 parameters are not updated. If, however, it is determined that the model error for the ACM 34 is greater than the model error for the AAM 36 (plus some tolerance factor), then the switch 40 will be closed and the ACM 34 can update itself, such as by adjusting its model parameters. After the update, the switch 40 opens again and the ACM 34 operates with its most recent updates.

Many variations are possible with the present invention. For example, FIG. 3 shows the ACM 34 and AAM 36 receiving information regarding input from the controller 38 to the process 32. However, the ACM 34 and AAM 36 may also receive information regarding other inputs to the process 32 or regarding other outputs of the process 32. For example the ACM 34 and AAM 36 may receive information about the disturbances and setpoints and other external factors that may impact the behavior of the process dynamics, including information provided by human operators. In addition, although the switch 40 controls certain information to the ACM 34, the ACM 34 may receive other information independent of the switch 40 (e.g., the ACM 34 may receive certain information even when the switch 40 is open). Furthermore, although the AAM 36 is not illustrated as providing information to the controller 38, it may also provide information to the controller 38 or to other devices.

In addition, the present invention may filter the process variables received by one or more devices. In the illustrated embodiment, the output of the process 32 represents the filtered process variables. The present invention may also include the controller 38 providing an input to another controller which in turn provides the input to the process in a cascade arrangement. See, for example, *PID Controllers: Theory, Design and Tuning*, (K. Astrom and T Hagglund, $2^{nd}$ edition Instrument Society of America, Research triangle Park, N.C., 1995). In the illustrated embodiment, the process 32 in FIG. 3 represents a feedback system which may comprise several distinct sub-processes and controllers. These controllers may be PID controllers, predictive controllers, adaptive controllers, or other controllers as described herein.

Figure 4:
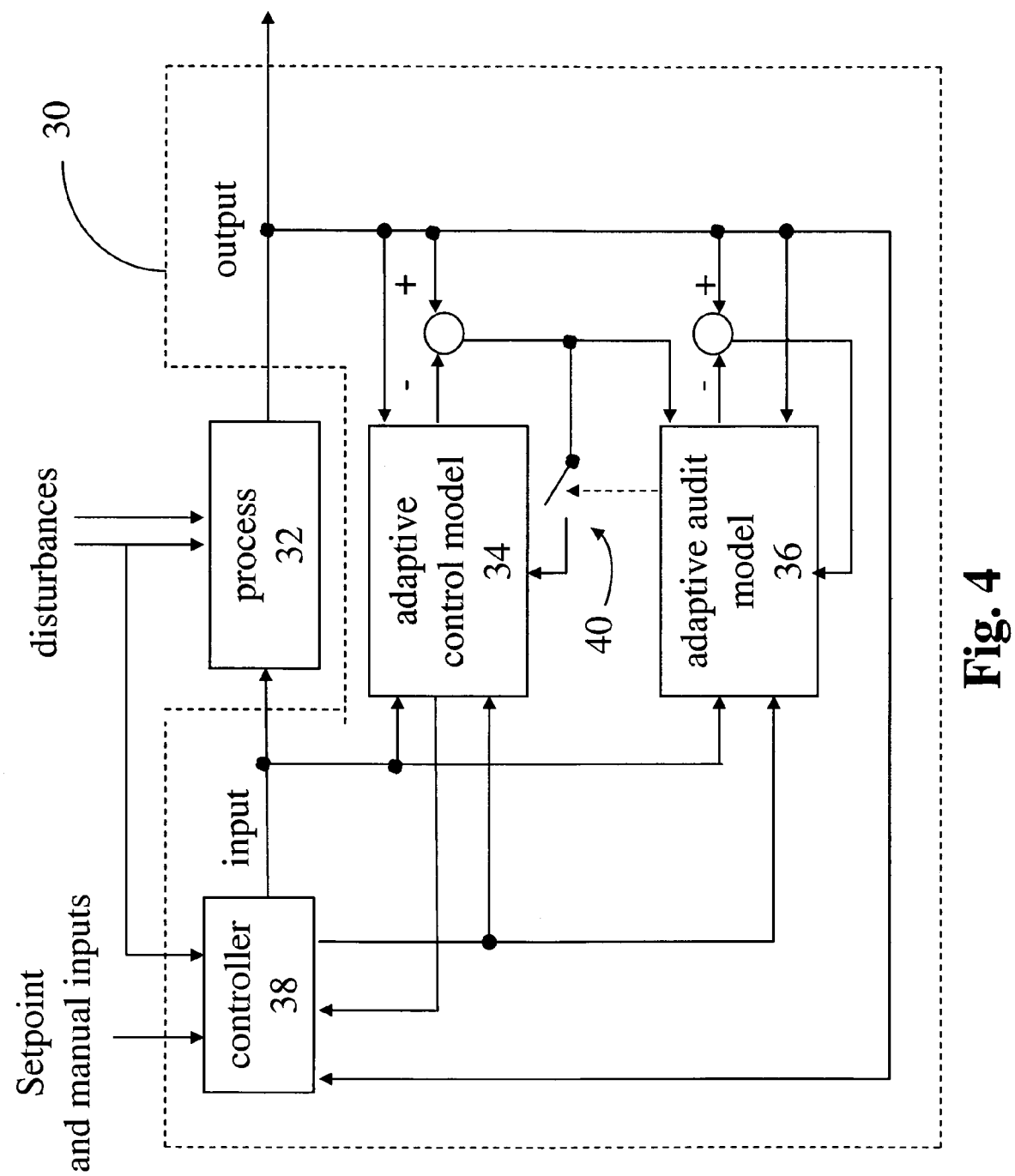
FIG. 4 is a block diagram illustrating another embodiment of the present invention.

FIG. 4 is a block diagram of a system 30 illustrating another embodiment of the present invention. In that embodiment, the controller 38 receives information in addition to that provided by the ACM 34. In particular, the controller 38 receives information about a set point value, the output, and the disturbances. The set point value and the disturbances may be constant or they may vary. With regard to the disturbances, the controller 38 receives some information about some disturbances (e.g., those disturbances which can and are measured), but the controller 38 does not receive other information about disturbances (e.g., that information which cannot or is not measured). The controller 38 may also receive more or less information than that illustrated herein. For example, the controller 38 may receive information from the AAM 36 or from other sources. In addition, the ACM 34 and the AAM 36 receive information about the controller 38 and the output of the process 32. This information may, for example, relate to the setpoint and the disturbance inputs to the process and it also captures information derived process measurements which may be filtered or otherwise transformed by linear or nonlinear functions. The ACM 34 and AAM 36 may also receive other information from other sources.

The systems and devices of the present invention may perform methods in accordance with the teachings and suggestions provided herein. For example, systems and devices according to the present invention may perform methods which include some or all of the following steps.

(1) Controlling or affecting at least one input to the process 32. This may be done, for example, by the controller 38.

(2) Varying or adjusting one or more parameters used in controlling the inputs to the process 32. These parameters may be, for example, the parameters of the controller 38, and these parameters may be varied or adjusted in response to information received from the ACM 34, the AAM 36, the process 32, or other sources. In one embodiment, the parameters of the controller 38 are updated when the parameters of the ACM 34 are updated.

(3) Estimating or modeling the state of the process 32. This may be done, for example, by the ACM 34.

(4) Predicting the output of the process 32. This may be done, for example, by the ACM 34, which may predict the output of the process 32 by using the estimated or modeled state of the process 32 as well as other information, such as information regarding inputs to the process 32.

(5) Determining the amount by which the predicted output of the process 32 differs from the actual output of the process 32.

(6) Updating the parameters used to predict the output of the process 32 when the predicted output differs from the actual output of the process 32 beyond a predetermined limit. For example, the parameters of the ACM 34 may be updated when the ACM 34 error exceeds certain limits.

Some of these steps may be modified, condensed into fewer steps, or expanded into additional steps. In addition, the steps may be performed in an order which is different than that set forth herein, and the order of performing the steps may be constant or it may vary.

Figure 5:
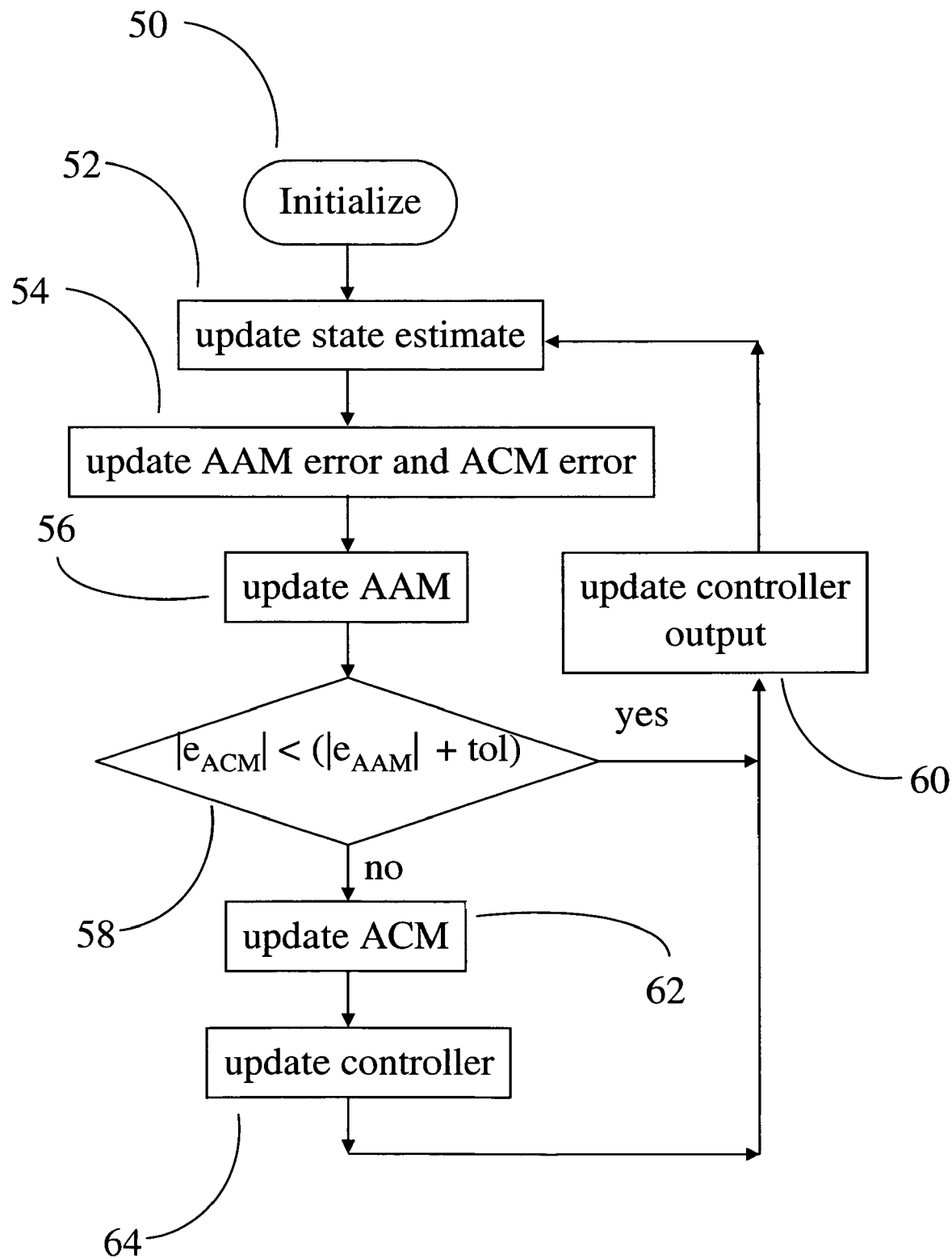
FIG. 5 is a flow chart illustrating a method according to the present invention.

FIG. 5 illustrates one embodiment of a method according to the present invention. The method may be used, for example, in the operation of the systems and devices described herein or in the operation of other systems and devices.

In step 50 the method starts with the initialization of one or more devices. Although initialization is not necessarily required, initialization is widely used in industrial and other methods to assure that the method starts in a known or otherwise acceptable state.

In step 52 a state estimate for the process 32 is formed or updated by each of the ACM 34 and the AAM 36. These estimates of the state of the process 32 may be used by the ACM 34 and the AAM 36, for example, to model the output of the process 32.

In step 54 an "error" value is calculated or updated for each of the ACM 34 and the AAM 36. These "error" values have been illustrated in FIGS. 3 and 4 as a difference between the actual output of the process 32 and the outputs modeled by each of the ACM 34 and the AAM 36. The modeled outputs by the ACM 34 and the AAM 36 are based, at least in part, on the state estimate formed or updated in step 52. These "error" values can provide an indication of how accurately the modeling by the ACM 34 and the AAM 36 correspond to the actual process 32.

The "error" value may take on many forms. For example, the error value may represent a single measure, such as the difference between an output of the process 32 and a modeled output of the process. Alternatively, it may represent two or more measures, such as the sum of the difference between two or more outputs of the process 32 and two or more corresponding modeled outputs. Furthermore, the "error" values may be raw values, such as temperature, flow, throughput, or the like, or they may be processed values, such as by averaging past values, performing a "least squares" method, applying linear filters, or other factors, or otherwise processing the "error" values.

In step 56 the AAM 36 is updated. This update may include, for example, updating the parameters of the AAM 36. The parameters of the AAM 36 may be updated, for example, in response to the AAM error (e.g., the difference between an output of the process 32 and output of the process modeled by the AAM 36). This allows the AAM 36, for example, to determine how accurately the AAM 36 model is predicting the actual process 32, and to make adjustments to improve the modeling. The update may also include the difference between the output of the process 32 and the modeled output by the ACM 34. This allows the AAM 36, for example, to determine how accurately the ACM 34 model is predicting the actual process 32.

In step 58 it is determined whether the error value corresponding to the ACM 34 exceeds the error value corresponding to the AAM 36 plus a tolerance factor ("tol"). As discussed above, the tolerance factor will vary depending on the particular application. If the error value corresponding to the ACM 34 does not exceeds the error value of corresponding to the AAM 36 plus the tolerance, then the method proceeds to step 60. In that case, the error value corresponding to the ACM 34 is within acceptable limits and the ACM 34 is not updated. Otherwise, the method proceeds to step 62.

In step 60, the output of the controller 38 is updated based on the existing parameters of the controller 38 and other information provided to the controller 38, such as the estimated state of the process. As long as the ACM 34 error is within acceptable limits, the controller 38 continues to operate on its existing parameters. In contrast, when the ACM 34 is updated the controller 38 is also updated and, thereafter, the controller 38 operates with its new parameters. After step 60, the method returns to step 52 and the process continues.

In step 62, the ACM 34 is updated. This update may include, for example, updating the parameters of the ACM 34 using a least squares method with modifications including fixed or variable forgetting factors, covariance reset and parameter projection. The parameters of the ACM 34 can be updated independent of the particular parameters of the AAM 36, such as by updating the ACM 34 in response to the ACM error (e.g., the difference between an output of the process 32 and output of the process modeled by the ACM 34). This allows the ACM 34, for example, to determine how accurately its model is predicting the actual process 32, and to make adjustments to its parameters to improve the modeling.

The update of the ACM 34 may be accomplished, for example, by closing the switch 40 illustrated in FIGS. 3 and 4. Alternatively, the "switch" 40 may take other forms, such as logic circuits which electronically or otherwise allow the update of the ACM 34 to occur. This update occurs because it has been determined that the error value corresponding to the ACM 34 is not within acceptable limits. This may happen during the initial tuning phase when both ACM 34 and AAM 36 learn the dynamics of the process, or it may be the result of change in a disturbance or some other change, such as in the process 32 which shows that it is advantageous to update the ACM 34 model to give better predictions.

In step 64, the controller 38 is updated. This update may include, for example, updating the parameters of the controller 38. The parameters of the controller 38 may be updated, for example, in response to information regarding updates to the ACM's 34 parameters. For example, information regarding new or adjusted parameters for the ACM 34 may be provided to the controller 38, which may then make appropriate adjustments to its own parameters, or another device, such as the ACM 34, may determine the appropriate adjustments for the controller's 38 parameters and send that information to the controller 38. Thereafter, the method proceeds to step 60.

The method described above may be modified and other variations are possible. For example, the order of the steps may be changed, steps may be added, and steps may be removed. In one embodiment, for example, step 60 occurs between steps 52 and 54. In another embodiment, for example, it is possible for some of the controller's 38 parameters to be updated while the ACM 34 error is within acceptable limits, and for other of the controller's 38 parameters to only be updated when the ACM's 34 parameters are updated. In some embodiments, for example, the method may be executed according to a sampling procedure, and the sampling time may be fixed or variable. Other changes and variations are also possible within the scope of the present invention.

Many other variations are possible with the present invention. For example, the present invention can be implemented, for example, using a discrete time approach (e.g., difference equations) or a continuous time approach (e.g., differential equations). Similarly, the present invention may be utilized with many different ways of estimating the state of the process. The state, for example, can be a vector of delayed inputs and outputs often called a regression vector. In addition, many different norms may be used to compare the error in step 58. Also, many estimation algorithms and models may be used to produce model errors. Furthermore, many methods are suitable for calculating control parameters. For example, a method using auto-regressive moving average models and multi-variable extended horizon control, is described by Ydstie, B. E., Liu, L. K. and Kemna, A. H., "Multivariable Extended-Horizon Adaptive Control", Comp. Chem. Eng., Vol. 12, No. 7, 1988, pp. 733-743 may be used. Some embodiments of the present invention may use, for example, nonlinear estimation and predictive control using neural networks.

In addition to those described hereinabove, several additional embodiments of the present invention will now be described. These embodiments are illustrative and not limiting of the present invention. Many other embodiments are possible with the teachings of the present invention.

One embodiment of the present invention is a single input, single output, discrete time adaptive linear control. This embodiment may be implemented using a state estimator which includes a filter to suppress noise. In this case the state (often called a regression vector) has the row vector form $$\phi(t) = (y_f(t), y_f(t-1), \ldots, y_f(t-n), u_f(t-d), u_f(t-d), \ldots, u_f(t-d-m))$$

where $y_f(t)$ denotes the filtered output of process 32 and $u_f(t-d)$ denotes the filtered input to process 32. The integer numbers n and m represent the order of the model and $d>0$ represents an estimate of the delay. The discrete filters are defined so that $$y_f(t) = F_y(q)y(t) \quad u_f(t) = F_u(q)u(t)$$

where $F_y(q)$ and $F_u(q)$ are linear transfer functions that reduce noise, remove bias and scale the variables in order to improve numerical stability. We can for example use filters on the form $$F(q) = \frac{q^2(1-a)}{(q-1)(q-1)}$$

where q is the forward shift operator defined so that $qy(t-1) = y(t)$.

The output of the ACM 34 is defined so that $$e_{ACM}(t) = y_f(t) - \phi(t-1)\theta_{ACM}(t-1)$$

where $\theta_{ACM}(t-1)$ is the column vector of ACM parameters. The output of the AAM 36 is defined so that $$e_{AAM}(t) = y_f(t) - \phi(t-1)\theta_{AAM}(t-1)$$

where $\theta_{AAM}(t-1)$ is the column vector of AAM parameters. The AAM parameters are updated using a recursive least squares algorithm with a fixed or variable "forgetting", a condition number monitor to ensure that the condition number of the covariance matrix is bounded and parameter projection to ensure that the estimated parameters remain inside fixed bounds. Examples of such algorithms are described in the literature (Adaptive Control, Second Edition, K. J. Astrom and B. Wittenmark, Addison-Wesley Pub. Co. Reading Mass., 1995, Goodwin G C, Hill D J, Mayne D Q. Design issues in adaptive control. IEEE Transactions on Automatic Control 1988; 33(1):50-58.) and with a variance estimator as described by *Adaptive Control with Selective Memory*, by Hill and Ydstie (cited above), using the error of the ACM 34 to estimate the variance.

The prediction errors are now compared according to the test criterion $$|e_{ACM}(t)| \leq (1+\delta)|e_{AAM}(t)|$$

where $0 \leq \delta$ is the tolerance. The ACM is updated using the same type of least squares algorithm as we used to update the AAM. However, the Covariance matrices of the algorithms are in general different. We typically set $\delta = 2$. This ensures that prediction error of the ACM is updated if its error is three times larger than the prediction error of the AAM.

The controller equation can be implemented using the Extended Horizon Controller method described by Ydstie, B.

E., Liu, L. K. and Kemna, A. H., "Multivariable Extended-Horizon Adaptive Control", Comp. Chem. Eng., Vol. 12, No. 7, 1988, pp. 733-743

In the case of a process with a single input and a single output the filtered controller signal is then determined according to the expression $$u_f(t) = \frac{1}{\sum_{i=1}^{T} \beta_i} (y_{SP}(t+T) - \alpha_1 y_f(t) -, \ldots ,$$

$$\alpha_n y_f(t-n+1) - \beta_{T+1} u_f(t-1) -, \ldots , \beta_{T+1} u_f(t-m))$$

and the controller parameters $\alpha_i$ and $\beta_1$ are the controller parameters determined using the parameters. This control law has a single tuning parameter T called the prediction horizon. The prediction horizon has to be larger than the process delay time d.

T=d gives fast response with minimum variance control performance d<T<d+3: gives medium speed of response; and d+3<T gives slow response.

Another embodiment of the present invention is for Adaptive PID control with feed forward. In that embodiment, the algorithm the structure may be chosen so that the EHC has the PID structure.

Another embodiment of the present invention is for multiple input multiple output control with feed forward from measured disturbances and constraints Model Predictive Control as described by (Morari, M. and G Gentilini, Challenges and opportunities in process control: Biomedical processes, AIChE J., Vol 47, pp 2140-2143, 2001).

The present invention has a wide range of applicability which may vary from that which is illustrated herein. For example, the process 32 may have more than one input, more than one output, and the inputs and outputs of the process 32 may be connected in ways other than that illustrated herein. Some or all of the process 32, including some or all of the inputs and outputs thereto, may be controlled, measured, and/or modeled. Information regarding more than one input and information regarding more than one output may be provided to the ACM 34 and AAM 36. In addition, the AAM 36 may provide information to the controller 38. Also, some information regarding one or more outputs of the process 32 may be provided to the ACM 34 separate from the switch 40. The process 32 may be almost any form of process, such industrial processes, commercial processes, or other processes. All algorithms according to the present invention may be implemented, for example, so that they can handle process constraints and they may also apply the use of a stochastic or other noise filters. The least squares algorithm can be modified, for example, to enhance robustness by using a factorization or it can be implemented using a batch scheme. The examples provided herein are illustrative and not limiting, and other variations and modifications of the present invention are contemplated. Those and other variations and modifications of the present invention are within the spirit and scope of the present invention, and it is intended that the foregoing specification and the following claims cover such modifications and variations.

The invention claimed is:

1. A system for controlling a process, wherein the process has an input and an output, comprising:
   a computer; and
   software, executing on said computer, said software performing the steps of:
      controlling the input to the process;
      predicting the output of the process based on an adaptive control model having a first set of operating parameters, including the controlled input to the process and one or more process outputs;
      predicting the output of the process based on an adaptive audit model having a second set of operating parameters, including the controlled input to the process and one or more process outputs; and
   allowing the adaptive control model access to the one or more process outputs only when a result from predicting the output based on the adaptive control model differs from the output of the process by more than a predetermined amount, wherein the predetermined amount is a function of the output predicted by the adaptive audit model.

2. The system of claim 1, wherein:
controlling the input of the process is based on operating parameters which are modified in response to updating the first set of operating parameters.

3. The system of claim 1, further comprising updating the second set of operating parameters in response to the output of the process.

4. The system of claim 1, wherein the process has a state that changes with time, further comprising:
   modeling the state of the process based on the input; and wherein:
   predicting the output of the process based on the adaptive control model further includes predicting the output of the process based on results from modeling the state of the process; and wherein
   predicting the output of the process based on the adaptive audit model further includes predicting the output of the process based on results from modeling the state of the process.

5. A system for controlling a process, wherein the process has an input and an output, comprising:
   a computer; and
   software, executing on said computer, said software performing the steps of:
      controlling the input to the process;
      predicting the output of the process based on an adaptive control model including a first set of operating parameters;
      predicting the output of the process based on an adaptive audit model including a second set of operating parameters;
      updating the first set of operating parameters when a result from predicting the output based on the adaptive control model differs from the output of the process by more than a predetermined amount, wherein the predetermined amount is a function of the output predicted by the adaptive audit model; and
      updating the second set of operating parameters to reduce an error indicative of a difference between the output of the process and the output predicted based on the adaptive audit model.

6. The system of claim 5, wherein updating the second set of operating parameters includes performing a least squares method.

7. A system for controlling a process, wherein the process has an input and an output, comprising:
   a computer; and
   software, executing on said computer, said software performing the steps of:

controlling the input to the process;

predicting the output of the process based on an adaptive control model including a first set of operating parameters;

predicting the output of the process based on an adaptive audit model including a second set of operating parameters;

calculating an error between the process output and an output predicted based on the adaptive control model;

calculating an error between the process output and an output predicted based on the adaptive audit model; and wherein updating the first set of operating parameters includes updating the first set of operating parameters when the error based on the process output and an output predicted based on the adaptive control model differs by more than a predetermined tolerance from the error between the process output and an output predicted based on the adaptive audit model.

8. The system of claim 7, wherein the predetermined tolerance is greater than zero.

9. The system of claim 7, wherein the predetermined tolerance is constant.

10. A system for controlling a process, wherein the process has an input and an output, comprising:

a controller having an output which affects the input of the process;

an adaptive control model including an adjustable model of the process, wherein the adaptive control model receives a signal indicative of the input to the process, and wherein the adaptive control model produces a signal indicative of a predicted output of the process;

an adaptive audit model including an adjustable model of the process, wherein the adaptive audit model receives a signal indicative of the input to the process, wherein the adaptive audit model receives a signal indicative of the output of the process, and wherein the adaptive audit model produces a signal indicative of a predicted output of the process; and a switch connecting the output of the process to the adaptive control model, wherein the switch is controlled in response to a model error for the adaptive audit model.

11. The system of claim 10, wherein the adaptive control model includes operating parameters which are modified in response to changes in the switch.

12. The system of claim 11, wherein the switch carries a signal indicative of the output of the process, and wherein the operating parameters of the adaptive control model change in response to the output of the process.

13. The system of claim 11, wherein the controller includes operating parameters, wherein the controller is connected to the adaptive control model, and wherein the operating parameters of the controller are modified in responses to modifications to the operating parameters of the adaptive control model.

14. The system of claim 13, further comprising a control design algorithm connected between the controller and the adjustable model of the adaptive control model.

15. The system of claim 11, wherein the switch carries signal indicative of a model error corresponding to the adaptive control model, and wherein the operating parameters of the adaptive control model change in response to the model error.

16. The system of claim 11, wherein the controller is a PID controller, and wherein the controller includes operating parameters which are modified in response to modifications to the operating parameters of the adaptive control model.

17. The system of claim 10, wherein the process has a state that changes with time, and further comprising a state estimator having an input indicative of the input to the process and having an output.

18. The system of claim 17, wherein the adaptive control model is responsive to the output of the state estimator.

19. The system of claim 17, wherein the adaptive control model includes the state estimator.

20. The system of claim 10, wherein the process has a state that changes with time, further comprising;

a first state estimator having an input indicative of the input to the process, indicative of at least one output from the process, and having an output connected to the adaptive control model; and a second state estimator having an input indicative of the input to the process, indicative of at least one output from the process, and having an output connected to the adaptive audit model.

* * * * *